May 28, 1968  H. A. BARNARD  3,385,336
METHOD AND APPARATUS FOR CUTTING BALES
Filed Jan. 24, 1966  5 Sheets-Sheet 1
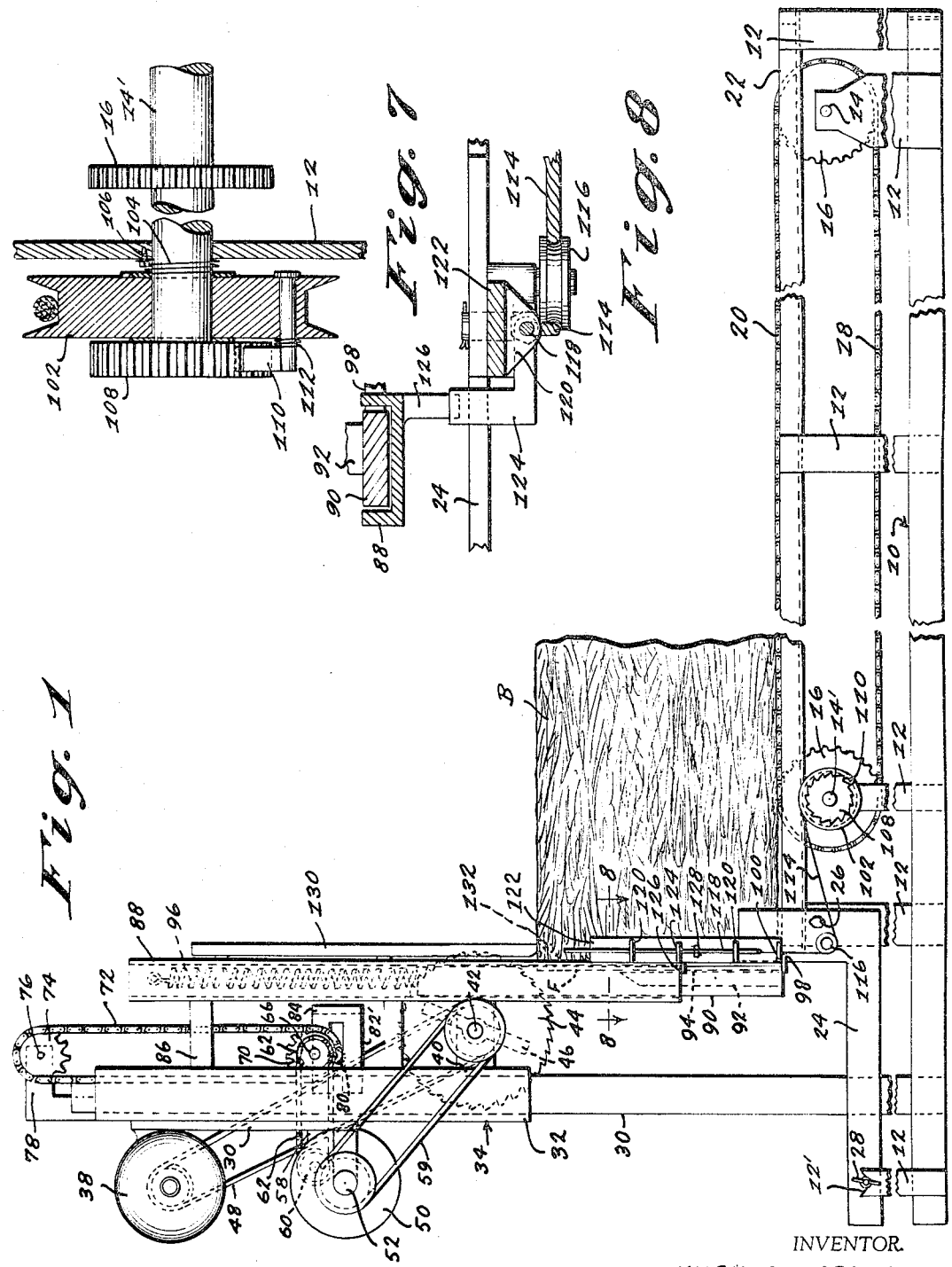
INVENTOR.
HUGH A. BARNARD

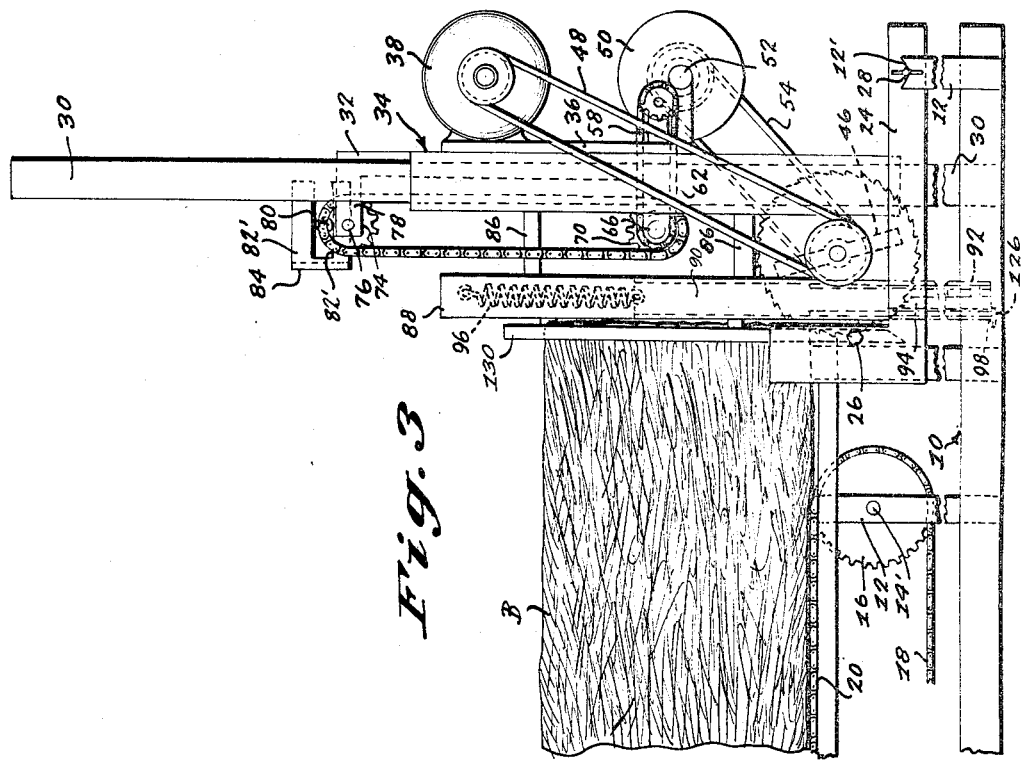

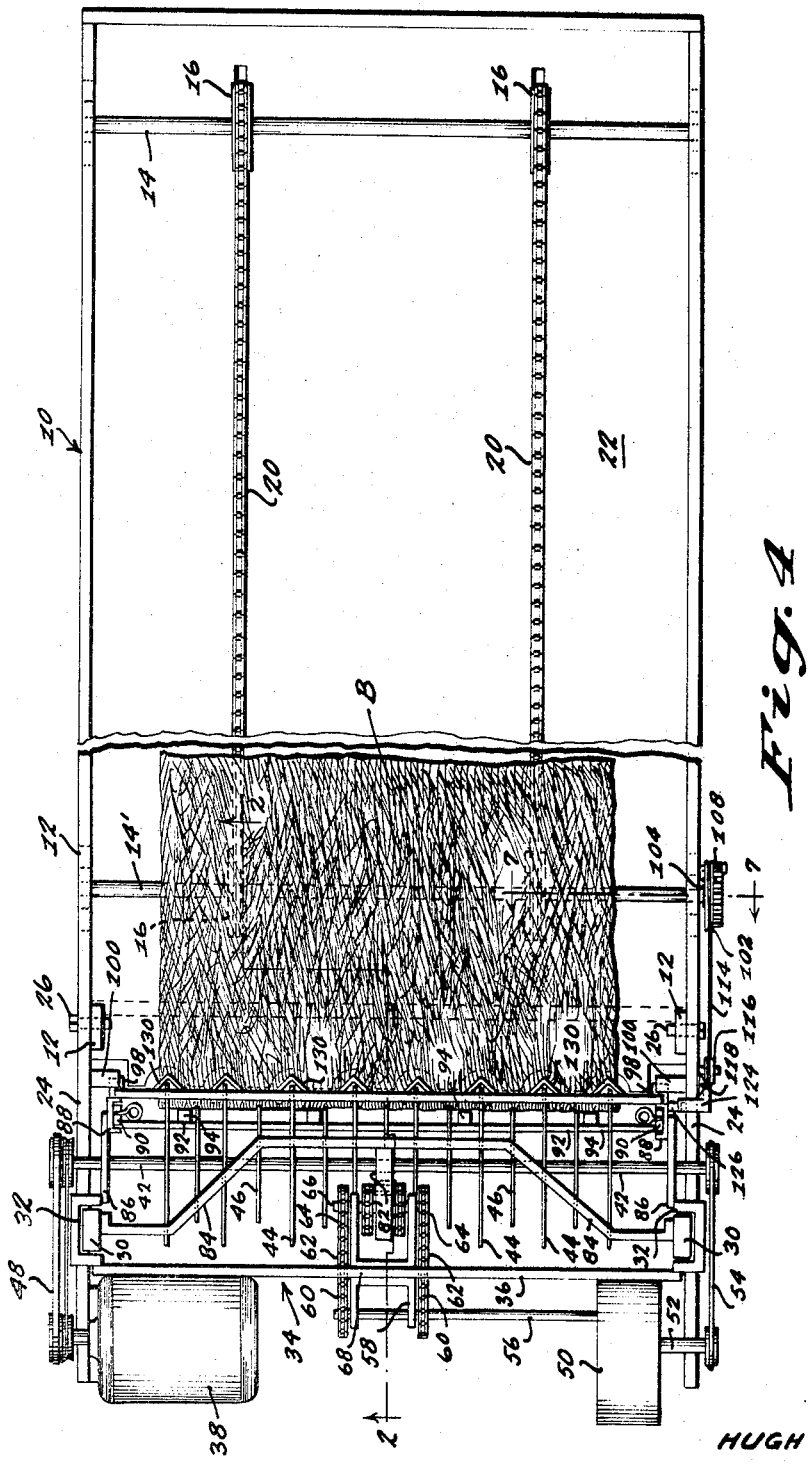

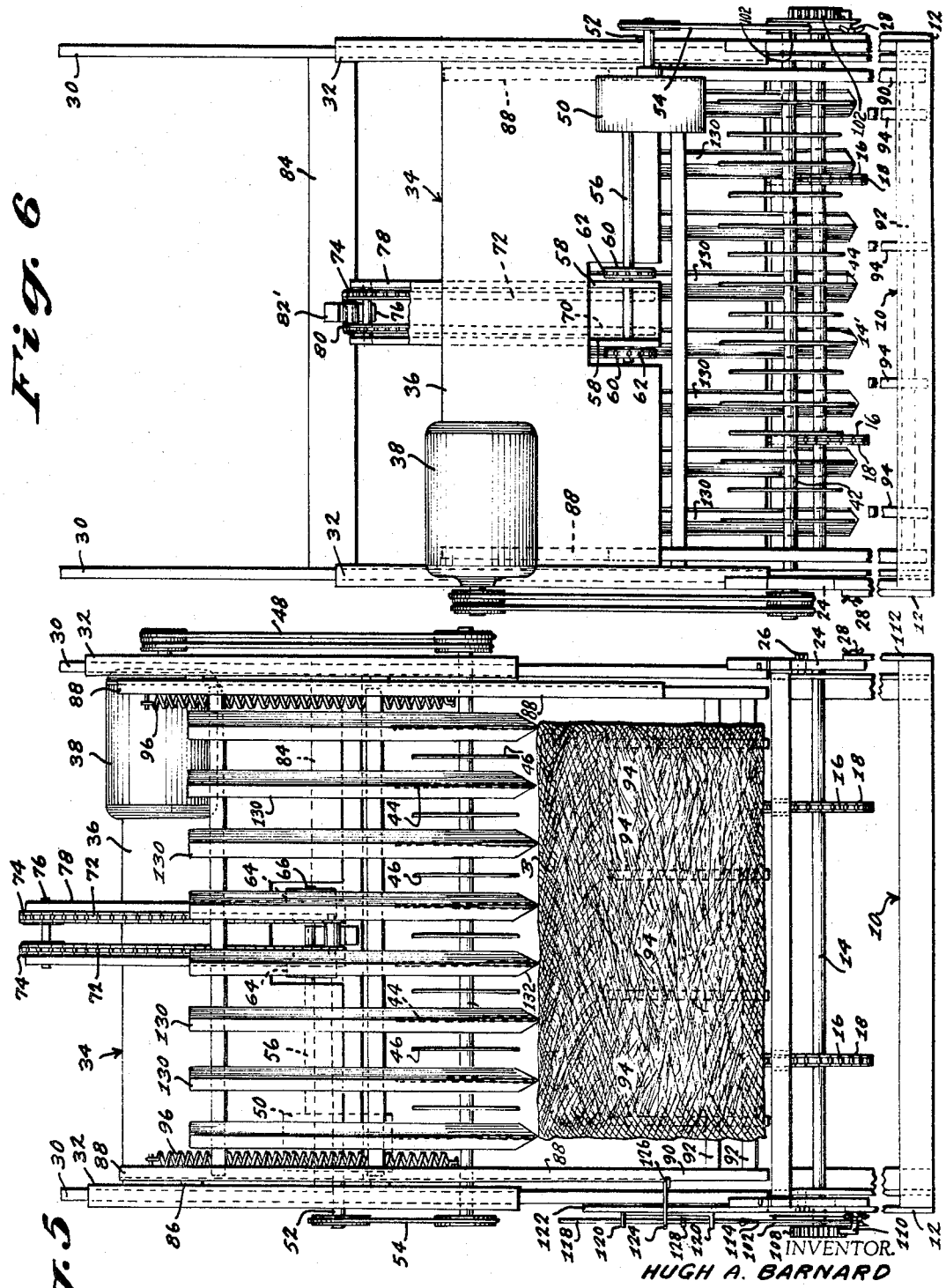

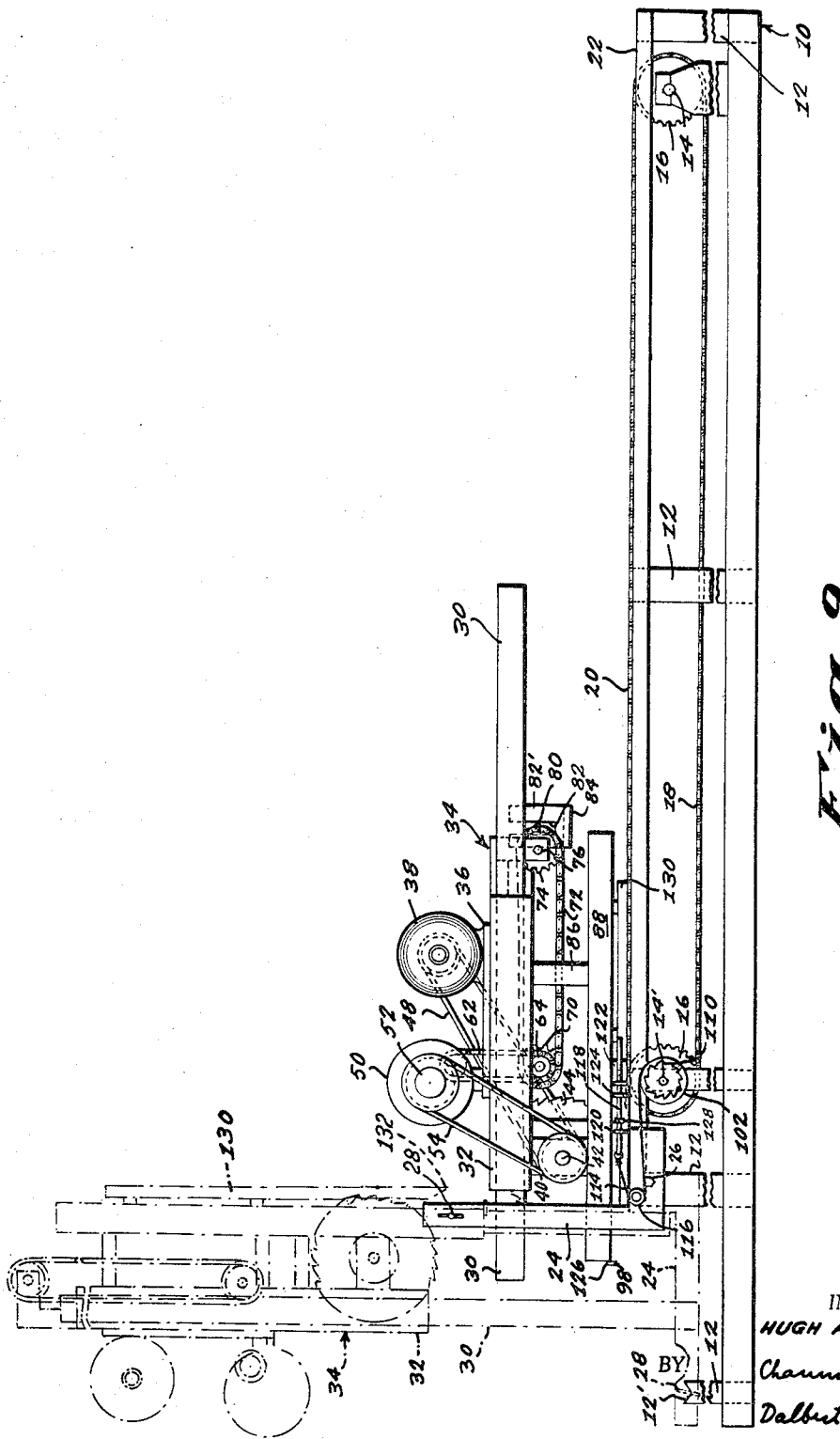

United States Patent Office 3,385,336
Patented May 28, 1968

3,385,336
METHOD AND APPARATUS FOR CUTTING BALES
Hugh A. Barnard, Rte. 1, Hamptonville, N.C. 27020
Filed Jan. 24, 1966, Ser. No. 522,476
16 Claims. (Cl. 146—241)

ABSTRACT OF THE DISCLOSURE

Apparatus for cutting hay bales or the like by passing a plurality of spaced circular saws through the end face of a temporarily stationary bale in a direction parallel thereto to cut the end portion of the bale into small pieces and then repositioning the saws and advancing the bale intermittently to position it for subsequent passes of the saws therethrough. Additionally, opening fingers are provided in depthwise advance of the saws to open the bale and clear foreign objects therefrom; a single power source is utilized to operate all of the moving elements of the apparatus, including the movable saws and the bale advancing arrangement; and the extending parts of the apparatus are arranged to be selectively pivoted to a compact position which facilitates storage and transportation thereof.

---

This invention relates generally to a method and apparatus for cutting bales, and more particularly to a method and apparatus for cutting bales of hay or the like in an expeditious and efficient manner using an apparatus that cuts the bales rapidly and substantially homogeneously at a significant saving in labor and expense as compared with prior practices.

Agricultural products such as hay are generally brought to a mill for processing in tied bales. At the mill, the ties are removed and the baled product is loosened and separated into relatively small pieces suitable for subsequent milling. Heretofore, this latter step has been accomplished by pulling the bale apart manually in handful clumps and feeding these clumps into the milling operation, which requires substantial labor and results in a wide variation in the size of the pieces fed to the mill.

By the present invention, the drawbacks of this manual operation are eliminated by an arrangement which, briefly described, provides for passing a plurality of spaced cutting elements through a bale end face in a direction substantially parallel to the plane thereof with the cutting elements disposed transversely to this plane for providing a cutting depth measured therefrom which is substantially less than the initial length of the bale whereby an end portion of the bale is cut into small pieces suitable for milling.

In the preferred embodiment, clearing members are disposed intermediate the cutting elements to facilitate removal of the cut pieces and cutting is facilitated further by opening means acting in advance of the cutting elements. The cutting elements, clearing members and opening means are mounted on a reciprocating carriage member with the carriage member and the cutting elements being driven by a single common power source advantageously utilized to drive both. This power source may also be used to feed the bale to the cutting elements with the result that only one power source is needed to drive all of the components of the apparatus. Further, extending parts of the apparatus may be pivotally mounted on a frame thereby permitting the parts to be selectively pivoted to a position which provides a more compact arrangement for storage and transportation of the apparatus.

These and other features of the present invention will be described hereinafter in conjunction with the following drawings, in which:

FIG. 1 is a right side elevation view illustrating a preferred embodiment of the apparatus for cutting a bale of hay or the like according to the present invention;

FIG. 2 is a partially sectioned fragmentary right side elevation view of the cutting apparatus taken along line 2—2 of FIG. 4;

FIG. 3 is a fragmentary left side elevation view of the cutting apparatus illustrating the cutting elements in their lowermost position;

FIG. 4 is a plan view of the cutting apparatus;

FIG. 5 is a front elevation view of the cutting apparatus illustrating the cutting elements disposed in their uppermost position;

FIG. 6 is a back elevation view of the cutting apparatus illustrating the cutting elements in their lowermost position with the bale omitted for clarity of illustration;

FIG. 7 is a detail view taken along line 7—7 in FIG. 4 illustrating the drive arrangement for advancing bales to be cut;

FIG. 8 is a detail view taken along line 8—8 in FIG. 1 illustrating the linkage through which the bale advance drive is operated; and FIG. 9 is a right side elevation view corresponding substantially with FIG. 1 and illustrating the cutting apparatus compactly disposed for storage, transportation or the like.

Referring now in detail to the drawings, FIG. 1 illustrates a frame 10 having upstanding support members 12 in which are journaled a pair of horizontally extending shafts 14, 14', each of which has a pair of spaced sprocket wheels 16 fixed thereto (see FIG. 4) supporting endless chains 18 which have the upper reaches 20 thereof extending horizontally along a flat bale supporting surface 22. A hay bale B rests on the chains 18 and is advanced thereby in a manner to be described in further detail below.

Also attached to one of the upstanding support members 12 is an L-shaped pivot plate 24 held thereat by a pivot bolt 26 and including at the horizontally extending end thereof an abutment stud 28 which is held by gravity against the V-shaped upper end 12' of a support member 12. A pair of guide stanchions 30 are fixed adjacent their lower end to the horizontal leg of pivot plate 24 and extend upwardly therefrom for supporting channel members 32 arranged to slide vertically thereon. These channel members 32 are part of a vertically movable carriage member generally indicated by reference numeral 34 which also includes a cross piece 36 extending between channel members 32 on which is mounted an electric motor 38 or similar power source. Also fixed to the channel members 32 are a pair of support arms 40 extending horizontally therefrom to rotatably support a shaft member 42 extending therebetween. Shaft member 42 has a plurality of horizontally spaced circular saw members 44 fixed thereto as well as clearing members 46 disposed between each pair of adjacent saw members 44. One of the extending ends of common shaft 42 is arranged to be driven by the motor 38 through a belt drive generally indicated by reference numeral 48 whereby the saw members 44 and clearing members 46 are rotated whenever motor 38 is energized. The rotating clearing members 46 are comprised of narrow projections extending radially from common shaft 42 in opposite directions and having a radial length slightly less than the radius of the circular saw members as best seen in FIG. 2. These clearing members 46 operate to clear away pieces of the bale which have been cut by circular saws 44.

To increase the operating efficiency of the cutting apparatus, the present invention provides an arrangement whereby the motor 38 is effectively utilized to cause vertical reciprocation of the carriage member 34 as well as driving the saw members 44 and clearing members 46. This arrangement includes a reduction gear unit 50 attached to the cross piece 36 and having its input shaft 52 connected to common shaft member 42 by a belt drive generally indicated by reference numeral 54. The output shaft 56 of reduction gear unit 50 is journaled in a bearing piece 58 (FIG. 4) and has a pair of sprocket wheels 60 fixed thereto, each of which is arranged to drive through chains 62 corresponding sprocket wheels 64 fixed to a stub shaft 66 journaled in a bearing piece 68 secured to cross piece 36. Stub shaft 66 has two additional drive sprockets 70 fixed thereto and meshing with chains 72 which have a vertical reach and extend about upper idler sprocket wheels 74 fixed to a stub shaft 76 journaled in a bearing member 78 fixed to cross piece 36. A rigid horizontally extending pin member 80 is journaled at its ends in corresponding link joints of chains 72 to form an integral connection therebetween which does not interfere with the mesh of chains 72 and sprockets 70, 74. As best seen in FIG. 2, the intermediate portion of pin member 80 is disposed between horizontally extending arms 82' of a bifurcated member 82 fixed to a stationary cross member 84 extending between the stationary guide stanchions 30 (FIG. 4). Since pin member 80 is always held against vertical movement by arm 82', rotation of drive sprockets 74 will result in such sprockets and idler sprockets 74 moving along chains 70 in a vertical direction and orbiting about pin member 80 whereby carriage member 34 is caused to reciprocate on guide stanchions 30. The horizontal extent of arms 82' accommodates the necessary horizontal movement of pin 80 when the carriage member 34 changes direction at its uppermost and lowermost positions (FIGS. 1 and 3). It will be appreciated, of course, that the speed of such vertical reciprocation is not necessarily dictated by the speed of drive motor 38 since a properly selected gear reduction unit 50 will determine the speed of reciprocation. Also, it is to be understood that it is within the scope of the present invention to provide any of a number of well-known variable speed reduction gear units if desired.

Carriage member 34 also includes horizontally extending support elements 86 fixed to channel members 32 and arranged in vertical pairs to support guide members 88. The guide members 88 are generally U-shaped for slidably supporting therein a pair of vertically extending slides 90 which are connected together adjacent the bottom ends thereof by a pair of cross members 92. Cross members 92 have a plurality of upstanding abutment members 94 fixed thereto and normally disposed in the path of the advance of the bale B for abutment with the leading end face F thereof to position the bale B for cutting in a manner to be described in further detail hereinafter below.

The abutment members 94 are maintained in their normal abutment disposition by compression springs 96 attached between slides 90 and guide members 88, respectively, to urge the slides 90, and consequently abutment members 94, upwardly until a projection 98 fixed at the bottom of each slide 90 contacts a cooperating stationary stop member 100 fixed to the frame 10 as best seen in FIG. 1. As the carriage member 34 begins to move downwardly from its FIG. 1 position, the guide members 88, which are integral therewith, will move downwardly also, sliding along slides 90 which are held stationary by springs 96 and projections 98 cooperating with stop members 100. However, when the bottom edges of guide members 88 reach the bottom edges of slides 90, they will contact projections 98 whereby slides 90 and abutment members 94 will then be carried by the guide members 88 as best seen in FIG. 2 during the remainder of the downstroke of carriage member 34 as well as a part of the upstroke thereof until the projections 98 again contact the stop members 100 whereupon the carriage member 34 and guide members 88 continue to rise, moving relatively to the slides 90. Thus, it will be seen that the abutment members 94 are disposed in the path of advance of the bale B for abutment with the end face F thereof during a portion of the movement of carriage member 34 and that the abutment members are carried by the carriage member 34 during the remaining portion of the carriage movement.

Another feature of the present invention is an arrangement whereby the previously described chains 18 are driven by carriage member 34 during a portion of the movement thereof whereby the energy of motor 38 is efficiently utilized to operate all of the various operations associated with the apparatus of the present invention. This driving arrangement includes a sheave 102 mounted on shaft 14' and rotatable with respect thereto as best seen in FIGS. 1 and 7. A spirally wound spring 104 has one of its ends secured to an upstanding support member 12 by a screw 106 and its other end secured to the sheave 102 to provide an angular bias to urge sheave 102 in a clockwise direction. A ratchet wheel 108 is secured to the end of shaft 114, and a ratchet arm 110 is journaled in the sheave 102 and biased against the ratchet wheel 108 by a coil spring 112 so that the ratchet wheel 108 and ratchet arm 110 will be engaged during counterclockwise movement of the sheave 102 while permitting sheave 102 to turn in a clockwise direction relative to the ratchet wheel 108 in a conventional ratchet-type manner. A connecting cable 114 is attached to sheave 102 and extends therefrom about an idler pulley 116 with its other end attached to a traveling rod 118 slidably mounted in stationary brackets 120 fixed to a vertical plate member 122. Traveling rod 118 has a pick-up projection 124 fixed thereto intermediate brackets 120 and extending in a direction toward one of the guide members 88 so as to be in abutting disposition with a cooperating extension piece 126 which may be welded or otherwise attached to the guide member 88 as seen in FIGS. 1 and 8. In addition, traveling rod 118 includes an adjustable abutment nut 128 threadably mounted thereon and arranged to cooperate with the lower bracket 120 to limit the movement of traveling rod 118 in a manner to be described in more detail hereinafter below.

The preferred embodiment of the present invention also includes a plurality of opening finger members 130 provided in shrouding relation at each of the circular saw members 44 and extending in the direction of movement thereof. Each of these opening fingers 130 is bent along the extending length thereof to provide angularly related side portions diverging in a direction toward the circular saw members 44 (FIG. 4) and presenting pointed tips 132 located in advance of the center line of shaft 42. The tips 132 will pierce the bale B as carriage member 34 moves downwardly and the diverging sides of fingers 130 will act to open the hay immediately adjacent and in depthwise advance of the saw members 44 to dispose it advantageously for cutting. In addition, these finger members 130 will serve to clear undesirable foreign objects such as rocks from the path of the saw members 44 as they pass through the bale B.

FIG. 9 illustrates a further feature of the present invention by which the vertically extending guide stanchions 30 may be selectively pivoted from their normal vertical position to a horizontal position in which the carriage member 34 and associated elements carried thereby rest adjacent the bale support surface 22 to provide a much more compact arrangement when it is desired to store or transport the apparatus. This is made possible by simply pivoting the pivot plate 24 about pivot bolt 26 until the entire vertical arrangement is moved from its dotted line position in FIG. 9 to its full-line position.

The operation of the present invention can be described by referring first to FIG. 1 where carriage member 34 is illustrated in its uppermost position, and end face F of bale B is in abutting relation with upstanding abutment members 94 for positioning thereby. Energization of motor 38 will drive shaft 42 to rotate the circular saws 44, and vertical chains 72 will be operated to cause vertical reciprocation of carriage member 34. As carriage member 34 moves downwardly in a direction substantially parallel to the plane of bale end face F, the circular saws 44, which are disposed at a right angle to the plane of end face F, will begin to pass through the bale at a cutting depth measured from such plane which is substantially less than initial length of bale B whereby a small end portion thereof is cut into small pieces by circular saws 44. The rotating clearing members 46 acting intermediately of circular saws 44 will facilitate removal of the cut pieces which are then permitted to fall away by gravity for collection. Moreover, as the carriage member 34 moves downwardly, the tips 132 of opening finger members 130 will enter the top of bale B to open the hay immediately adjacent and in depthwise advance of circular saws 44 as well as to knock out foreign objects and the like as previously described. Also, although motor 38 is utilized simultaneously to drive circular saws 44 and to cause vertical reciprocation of carriage member 34, the circular saws 44 are passed through the bale B on the downstroke of carriage member 34 whereby the power required to operate the circular saws 44 under a cutting load and to raise the carriage member can be supplied alternatively for efficient utilization of motor 38.

During the initial portion of the vertical descent of carriage member 34, the upstanding abutment members 94 are maintained in stationary position by spring 96. However, when the bottom edge of guide members 88 strikes projection 98 on slide 90, the upstanding abutment members 94 are then carried thereby (FIG. 2) in spaced relation to the circular saws 44 so as to avoid any possibility of contact between circular saws 44 and the upstanding abutment members 94 or support structure therefor.

Also, as carriage member 34 descends, the traveling rod 118 will be pulled downwardly by cable 114 because of spiral spring 104 acting on sheave 102, until adjustable nut 128 strikes lower bracket 120 whereupon projection 126 will no longer support the pick-up extension 124 and will continue moving downwardly. As traveling rod 118 descends, sheave 102 turns in a clockwise direction relative to ratchet wheel 108 so that advancing chains 18 remain stationary.

Carriage member 34 continues moving downwardly until sprockets 70 and 74 have reached their lowermost position in their orbit about pin member 80 as seen in FIG. 3 whereupon the carriage member 34 will begin to move upwardly. Upstanding abutment members 94 continue to be carried thereby until projections 98 on slides 90 strike the fixed stops 98 whereupon upstanding abutment members 94 are maintained stationary in their abutting disposition as carriage member 34 continues to rise and guide members 88 slide relative to slides 90.

Also, as carriage member 34 rises, the projections 126 will contact pick-up extensions 124 thereby causing traveling rod 118 to be moved upwardly. Traveling rod 118 exerts a pulling force on cable 114 which rotates sheave 102 in a counter-clockwise direction and ratchet wheel 108 is turned therewith because of the locking action of ratchet arm 110. As ratchet wheel 108 is turned, sprocket wheels 16 will also be turned to cause movement of advancing chains 18 along flat supporting surface 22 in the direction toward the path of circular saws 44. Thus, movement of advancing chains 18 will cause bale B to be advanced relative to circular saws 44 to position the cut face of bale B for subsequent cutting action by circular saws 44. It will be noted that the bale advancing arrangement does not require an independent power source, but is driven from motor 38 through the movement of carriage member 34.

The present invention has been described in detail above for purposes of illustration only and is not intended to be limited by this description or otherwise except as defined in the appended claims.

I claim:

1. A method of cutting a bale of hay or the like into small pieces, said method comprising the steps of passing a plurality of spaced cutting elements through the end face of a temporarily stationary bale in a direction substantially parallel to the plane thereof with said cutting elements disposed transversely to said plane to provide a cutting depth measured therefrom which is substantially less than the initial length of said bale whereby an end portion of said bale is cut into small pieces and permitted to fall away, repositioning said plurality of cutting elements for a subsequent pass in said direction parallel to the plane of said bale end face, and then intermittently advancing said bale relative to said cutting elements to position the cut face of said bale for subsequent cutting by said cutting elements.

2. A method of cutting a bale of hay or the like as described in claim 1 and further characterized in that said plurality of cutting elements are passed downwardly through a vertical end face of said bale.

3. A method of cutting a bale of hay or the like as described in claim 1 and further characterized by spreading the portion of said bale immediately adjacent and in depthwise advance of each of said cutting elements to facilitate the cutting action thereat.

4. Apparatus for cutting a bale of hay or the like into small pieces comprising cutter means including a plurality of spaced cutting elements arranged on a reciprocating carriage member to pass through the end face of a temporarily stationary bale in a direction substantially parallel to the plane thereof and to be repositioned for a subsequent pass through said bale, said cutting elements being disposed transversely to said plane to provide a cutting depth measured therefrom which is substantially less than the initial length of said bale whereby an end portion of said bale is cut into small pieces and permitted to fall away as said cutting elements are passed through said bale, and means for intermittently advancing said bale relative to said cutting elements after each pass thereof through said bale to position the cut face of said bale for subsequent cutting by said cutting elements.

5. Apparatus for cutting a bale of hay or the like as described in claim 4 and further characterized in that said cutter means is arranged for vertical movement to pass through a vertical end face of said bale.

6. Apparatus for cutting a bale of hay or the like as described in claim 4 and further characterized in that said cutter means is mounted on a reciprocating carriage member having drive means carried thereby, said drive means being operatively connected to reciprocate said carriage member and to drive said cutting elements simultaneously.

7. Apparatus for cutting a bale of hay or the like as described in claim 6 and further characterized in that said carriage member is arranged for vertical reciprocating movement with said cutting elements being passed through said bale during the downstroke of said carriage member whereby the power required to operate said cutting elements under a cutting load and to raise said carriage member can be supplied alternatively by said common drive means for efficient utilization thereof.

8. Apparatus for cutting a bale of hay or the like as described in claim 7 and further characterized by a frame having a bale support surface on which bales are advanced to said cutting elements, and vertical guide stanchions for supporting said carriage member during reciprocating movement thereof, said guide stanchions being pivotally mounted on said frame whereby said guide stanchions may be pivoted from the normal vertical position thereof to a horizontal position in which said carriage member and associated elements carried thereby rest adjacent said bale support surface to provide a more compact arrangement for storage and transportation of the apparatus.

9. Apparatus for cutting a bale of hay or the like as described in claim 6 and further characterized in that means are provided for advancing said bale toward the path of said cutting elements into position for cutting thereat, and in that said advancing means is arranged to be operated by said common drive means.

10. Apparatus for cutting a bale of hay or the like as described in claim 9 and further characterized in that said advancing means is operated by said common drive means through movement of said carriage member during one of the reciprocating strokes thereof whereby the advance of said bale is intermittent.

11. Apparatus for cutting a bale of hay or the like as described in claim 10 and further characterized in that said carriage member is arranged for vertical reciprocation, and in that said advancing means is operated during a portion of the upstroke thereof to advance said bale horizontally.

12. Apparatus for cutting a bale of hay or the like as described in claim 4 and further characterized in that opening means is provided in shrouding relation at each of said cutting elements for clearing undesirable objects from the path of the cutting elements and for opening the hay immediately adjacent and in depthwise advance of said cutting elements to dispose it advantageously for cutting.

13. Apparatus for cutting a bale of hay or the like as described in claim 12 and further characterized in that said cutting elements are comprised of a series of parallel spaced circular saw members fixed to a common drive shaft, and in that said opening means includes finger members extending in the direction of the movement of said saw members and presenting pointed tips located in advance of the common centerline of said saw members during the pass thereof through said bale end face.

14. Apparatus for cutting a bale of hay or the like as described in claim 13 and further characterized in that each of said finger elements is bent along the extending length thereof to provide angularly related side portions diverging in a direction toward said circular saw elements in shrouding relation thereto to facilitate said opening action.

15. Apparatus for cutting a bale of hay or the like as described in claim 4 and further characterized in that means are provided for advancing said bale toward the path of said movable cutter means for cutting action thereat, and in that positioning means are provided for disposition in the path of the advance of said bale for abutment with said end face thereof to position said bale for cutting, said positioning means beng selectively movable to clear said cutter means during said pass thereof through said end face.

16. Apparatus for cutting a bale of hay or the like as described in claim 15 and further characterized in that said cutter means is mounted on a carriage member arranged for reciprocating vertical movement, and in that said positioning means is carried by said carriage member below said cutter means and arranged for relative movement with respect to said carriage member to permit said positioning means to remain in said abutment disposition during a portion of the carrage movement and to be carried by said carriage member in spaced relation to said cutter means during the remaining portion of said carriage movement.

References Cited
UNITED STATES PATENTS

| | | | |
|---|---|---|---|
| 1,420,235 | 6/1922 | Bjorlin | 146—133 |
| 1,844,279 | 2/1932 | Gossard | 146—119 |
| 2,889,862 | 6/1959 | Williamson | 146—70.1 X |
| 3,175,595 | 3/1965 | Coutts | 146—70.1 |

W. GRAYDON ABERCROMBIE, *Primary Examiner.*